(12) United States Patent
Horowitz et al.

(10) Patent No.: US 8,396,974 B2
(45) Date of Patent: Mar. 12, 2013

(54) END-USER NOTIFICATION UPDATES OF SESSION EVENTS

(75) Inventors: Bruce Horowitz, Stockholm (SE); Justus Petersson, Stockholm (SE)

(73) Assignee: Telia-Sonera AB, Stockholm (SE)

( * ) Notice: Subject to any disclaimer, the term of this patent is extended or adjusted under 35 U.S.C. 154(b) by 116 days.

(21) Appl. No.: 12/674,794

(22) PCT Filed: Aug. 1, 2008

(86) PCT No.: PCT/SE2008/000465
§ 371 (c)(1),
(2), (4) Date: Jul. 20, 2010

(87) PCT Pub. No.: WO2009/029014
PCT Pub. Date: Mar. 5, 2009

(65) Prior Publication Data
US 2011/0246656 A1   Oct. 6, 2011

(30) Foreign Application Priority Data
Aug. 24, 2007  (SE) ...................... 0701936

(51) Int. Cl.
*G06F 15/16* (2006.01)
(52) U.S. Cl. ...................... 709/228; 709/230
(58) Field of Classification Search .................. 709/228, 709/230
See application file for complete search history.

(56) References Cited

U.S. PATENT DOCUMENTS
2002/0042826 A1   4/2002   Gaus et al.
(Continued)

FOREIGN PATENT DOCUMENTS
EP        1 608 190 A    12/2005
(Continued)

OTHER PUBLICATIONS
3GPP TS 23.228 v7.8.0 (Jun. 2007). 3rd Generation Partnership Project: Technical Specification Group Services and System Aspects; IP Multimedia Subsystem (IMS); Stage 2 (Release7). pp. 27-28, Paragraph [4.2.7].
(Continued)

*Primary Examiner* — Adnan Mirza
(74) *Attorney, Agent, or Firm* — Drinker Biddle & Reath LLP

(57) ABSTRACT

A method for controlling sessions between an IP Multimedia Subsystem network, IMS network, and at least two communication terminals (202, 204, 206, 208 302, 304, 306), and a communication system connectable to an IP Multimedia Subsystem network, IMS network, and at least two communication terminals (202, 204, 206, 208 302, 304, 306) each associated with a user, the users of the communication terminals sharing a common IP Multimedia Public Identity, IMPU. A control device (210, 310) for controlling sessions between the IMS network and the communication terminals (202, 204, 206, 208 302, 304, 306), and an identity database (212, 312) containing information about the identities of the users and/or the communication terminals (202, 204, 206, 208 302, 304, 306) sharing the common IMPU are provided. Data provision means for providing data, when one of the users/communication terminals (202, 204, 206, 208 302, 304, 306) accepts the session invitation, about which users/communication terminals (202, 204, 206, 208 302, 304, 306) are alerted based on said session invitation are provided. Notification means (222, 322) for sending a notification containing information about the identity of the user/communication terminal (202, 204, 206, 208 302, 304, 306) accepting the session invitation to the other alerted users/communication terminals (202, 204, 206, 208 302, 304, 306) is provided.

12 Claims, 4 Drawing Sheets

U.S. PATENT DOCUMENTS

2007/0067470 A1* 3/2007 Ayers et al. .................. 709/230
2007/0153999 A1 7/2007 Daigle
2011/0161508 A1* 6/2011 Kim et al. ..................... 709/228

FOREIGN PATENT DOCUMENTS

WO 03/038552 5/2003
WO 2007/045264 4/2007
EP 1 708 454 10/2006

OTHER PUBLICATIONS

H. Schulzrinne et al. "The Reason Header Field for the Session Initiation Protocol (SIP)" RFC 3326, The Internet Society Dec. 2002, pp. 1-8.
J. Rosenberg et al. "SIP: Session Initiation Protocol" RFC 3261, The Internet Society, Jun. 2002, pp. 1-269.

* cited by examiner

END-USER NOTIFICATION UPDATES OF SESSION EVENTS

TECHNICAL FIELD

The present invention relates to a communication system of the kind defined in the preamble of claim 1, and to a method of the kind defined in the preamble of claim 10.

BACKGROUND OF THE INVENTION

Today, IP Multimedia Subsystem, IMS, is an established technology within data and telecommunications. IMS can be described as an architectural framework for delivering internet protocol (IP) multimedia to mobile users. It was originally designed by the wireless standards body 3rd Generation Partnership Project (3GPP), and is part of the vision for evolving mobile networks beyond GSM. Its original formulation (3GPP R5) represented an approach to delivering "Internet services" over GPRS. This vision was later updated by 3GPP, 3GPP2 and TISPAN by requiring support of networks other than GPRS, such as Wireless LAN, CDMA2000 and fixed line. To facilitate the integration with the Internet, IMS as far as possible uses IETF (i.e. Internet) protocols such as Session Initiation Protocol (SIP). According to the 3GPP, IMS is not intended to standardize applications itself but to aid the access of multimedia and voice applications across wireless and wireline terminals. This is done by having a horizontal control layer that isolates the access network from the service layer. Services do not need to have their own control functions, as the control layer is a common horizontal layer. Since IMS was conceived years ago, it is becoming increasingly easier to access content and contacts using mechanisms outside the control of traditional wireless/fixed operators.

IMS requires IP Multimedia Private Identity (IMPI) and IP Multimedia Public Identity (IMPU). Both are not phone numbers or other series of digits, but Uniform Resource Identifier (URIs), that can be digits (a tel-uri, like tel:+1-555-123-4567) or alphanumeric identifiers (a sip-uri, like sip:john.doe@example.com). There can be multiple IMPU per IMPI (often a tel-uri and a sip-uri). The IMPU can also be shared with another communication terminal, so several communication terminals can be reached with the same identity, for example, a single phone-number for an entire family.

Session Initiation Protocol (SIP) is an application-layer control (signalling) protocol for creating, modifying, and terminating sessions with one or more participants. These sessions include Internet telephone calls, multimedia distribution, and multimedia conferences. SIP makes use of elements called proxy servers to help route requests to the user's current location, authenticate and authorize users for services, implement provider call-routing policies, and provide features to users. SIP also provides a registration function that allows users to upload their current locations for use by proxy servers. SIP runs on top of several different transport protocols.

The Session Initiation Protocol, SIP, is disclosed in detail in the paper "SIP: Session Initiation Protocol", by J. Rosenberg et. al., RFC 3261, The Internet Society, June 2002.

SIP is also discussed in the paper "The Reason Header Field for the Session Initiation Protocol (SIP)", by H. Schulzrinne et. al., RFC 3326, The Internet Society, December 2002. This paper discusses a further use of the Reason Header field.

A proxy server can send a session invitation to a number of locations at the same time. This type of parallel search is known as forking. This is for example the case when several users share a common IP Multimedia Public Identity, IMPU. However, there are problems in connection with this forking process. When several users share a common IMPU and a session invitation is directed to the common IMPU, and one of the users accept the invitation, the other users receive no information about the outcome of the session invitation. They do not know if the originator has cancelled the session invitation or if a user associated with the common IMPU has accepted to the invitation.

THE OBJECT OF THE INVENTION

The object of the present invention is thus to provide a more efficient control of sessions with regard to users sharing a common IP Multimedia Public Identity, IMPU.

SUMMARY OF THE INVENTION

The above mentioned object is achieved by providing a communication system of the kind defined in the introductory part, which comprises the features mentioned in the characterizing portion of claim 1, and by providing a method of the kind defined in the introductory part, which comprises the features which are mentioned in the characterizing portion of claim 10.

Hereby, the other users/communication terminals sharing the common IMPU receive information about the outcome of a session invitation in an efficient way, for example if the invitation was cancelled by the originator or accepted by one of the user. A response code according to the invention and by way of SIP can be expressed as 4xx CANCEL: session INVITE from the "public identity IMPU_xyz" accepted by the "public identity IMPU_abc".

According to an advantageous embodiment of the system according to the present invention, the notification means is adapted to include information about the identity of the originator of the session invitation in said notification. Hereby, the other users also receive information about the identity of the originator.

According to a further advantageous embodiment of the system according to the present invention, the data provision means comprise memory means for storing said data, and the control device comprises retrieval means for retrieving the data stored in the memory means when one of the users/communication terminals accepts the session invitation. This is an efficient way of providing the data about which users/communication terminals are alerted based on said session invitation, as the control device can rapidly retrieve the data without accessing the identity database.

According to another advantageous embodiment of the system according to the present invention, the communication system is adapted to access a voice mail server for recording and storing a message when none of the users/communication terminals accepts the session invitation, the notification means is adapted to notify all the users/communication terminals associated with the common IMPU that a message has been recorded, the retrieval means is adapted to retrieve the data stored in the memory means when one of the users/communication terminals consumes the recorded message, and the notification means is adapted to send a notification containing information about the identity of the user/communication terminal consuming the recorded message to the other users/communication terminals associated with the common IMPU. Hereby, the other users will be informed when one of the users has consumed the message, which message can be in voice format or text format. In this context, consuming a message means to read a message or to listen to a message, e.g., stored on the voice mail server.

According yet another advantageous embodiment of the system according to the present invention, the communication system comprises a memory means for each communication terminal, and each communication terminal includes such a memory means. Hereby, the terminals will be fully aware of the other terminals sharing the common IMPU, and the control device will receive all necessary data from the accepting terminal to be able to notify the other terminals associated with the common IMPU.

According still another advantageous embodiment of the system according to the present invention, the control device is provided with the memory means, and in that the control device is adapted to store data about the identity of the originator in the memory means. Advantageously, this memory means is in the form of a so called Cache which is a temporary storage area where frequently accessed data can be stored for rapid access.

According other advantageous embodiments of the system according to the present invention, the control device and the communication terminals are adapted to communicate by means of the Session Initiation Protocol, SIP, and the control device is adapted to communicate with communication terminals via a Home network and/or a Public network.

According to an advantageous embodiment of the method according to the present invention, information about the identity of the originator of the session invitation is included in the notification to the other users/communication terminals associated with the common IMPU.

According to a further advantageous embodiment of the method according to the present invention, the provision of said data includes the steps of storing said data in memory means, and retrieving the data stored in the memory means when one of the users/communication terminals accepts the session invitation.

According to another advantageous embodiment of the method according to the present invention, data about the identity of the originator is stored in the memory means.

According to yet another advantageous embodiment of the method according to the present invention, the method comprises the further steps of:
  recording and storing a message in a voice mail server when none of the users/communication terminals accepts the session invitation;
  notifying all the users/communication terminals associated with the common IMPU that a message has been recorded in the voice mail server;
  retrieving said data stored in the memory means when one of the users/communication terminals consumes the recorded message; and
  based on said data, sending a notification containing information about the identity of the users/communication terminal consuming the recorded message to the other users/communication terminals associated with the common IMPU.

According to still another advantageous embodiment of the method according to the present invention, each communication terminal is provided with a memory means, and each communication terminal is allowed to carry the information needed to inform the other users/communication terminals associated with the common IMPU.

According to an advantageous embodiment of the method according to the present invention, the sessions between the IMS network and the communication terminals are controlled by means of the Session Initiation Protocol, SIP.

Further advantageous embodiments of the method and the system, respectively, according to the present invention, emerge from the enclosed dependent claims and the detailed description of preferred embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF PREFERRED EMBODIMENTS

Abbreviations

Figure 1:
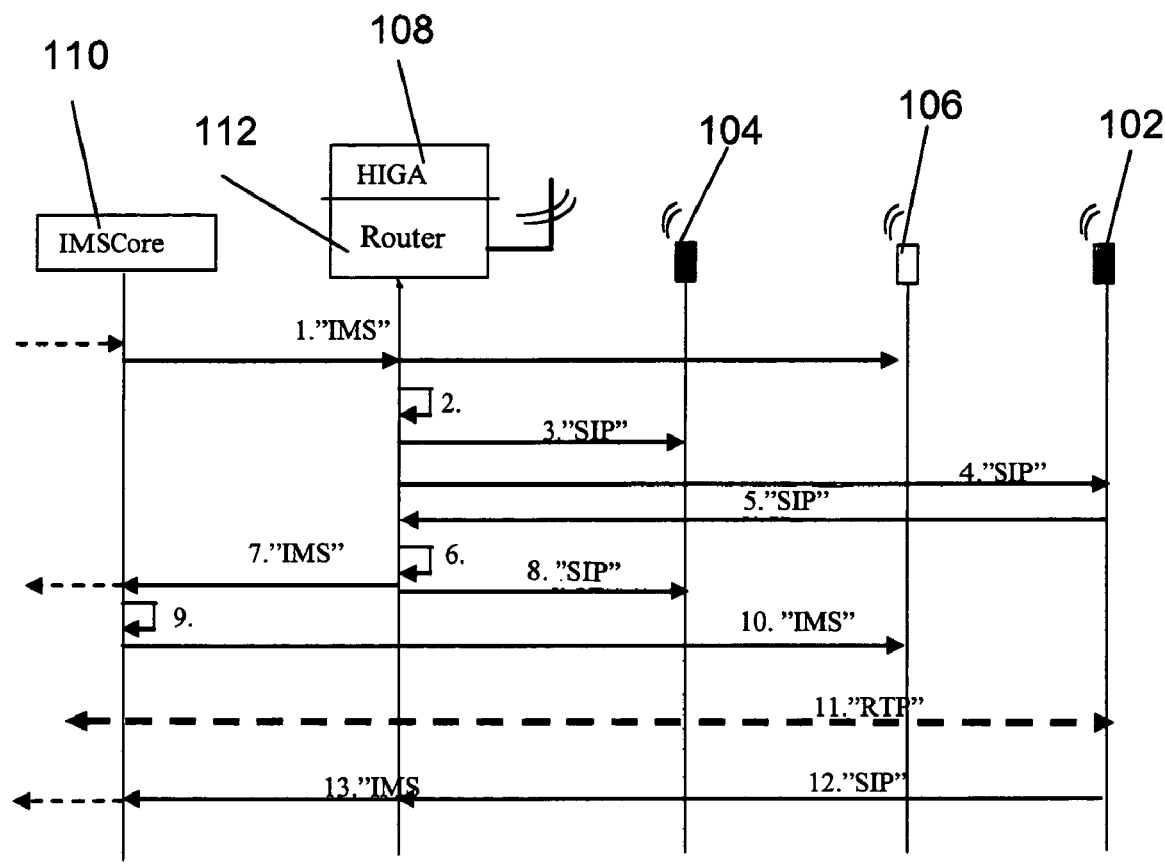
FIG. 1 is schematic flow diagram illustrating prior art.

B2BUA Back-to-Back User Agent
HIGA Home IMS Gateway
IMPI IP Multimedia Private Identity
IMPU IP Multimedia Public Identity
IMS IP Multimedia Subsystem
P2P Peer-to-peer
P2P RTP Peer-to-peer Real-time Transport Protocol
PSTN Public Switched Telephone Network
RTP Real-time Transport Protocol
SIP Session Initiation Protocol
SIP-AS SIP Application Server
URI Uniform Resource Identifier FIG. 1 illustrates a procedure where an originator calls the common number of a group of users and where SIP is applied. A first and a second user are located in the same residence and their two SIP phones 102, 104 and a dual mode phone 106 belonging to one of the users are active. All of the communication terminals 102, 104, 106 are associated with the common number. In the following example, a session invitation is initiated by the originator, whereupon the SIP phones 102, 104 (wifi enabled) and the dual mode phone 106 are ringing, the first user answers the call on his SIP phone 102, and as a consequence all others phones 104, 106 stop ringing: At 1, a session invitation is transmitted over IMS to the dual mode phone 106 and the HIGA 108, i.e. parallel forking from the IMS Core 110. The HIGA 108 is also connected to a router 112 for wirelessly directing calls to the communication terminals 102, 104, 106 in the residence. At 2, HIGA 108 checks addressees, capabilities and policies in order to relay the session invitation to the correct communication terminals 102, 104, 106, i.e. the HIGA 108 performs local parallel forking within the residence. At 3, HIGA 108 relays the IMS session invitation to the SIP phone 104 of the second user. At 4, HIGA 108 relays the IMS session invitation to the SIP phone 102 of the first user. At 5, the session invitation/call is answered by means of the SIP phone 102 of the first user. At 6, HIGA 108 checks which communication terminals it shall stop alerting. At 7, HIGA 108 sends a confirmation, IMS 200 OK, to the IMS system. At 8, HIGA 108 stops alerting the SIP phone 104 of the second user. At 9, As a consequence of step 7, the IMS Core 110 checks which communication terminals it shall stop alerting. At 10, IMS Core 110 stops alerting the dual mode phone 106. At 11, a P2P RTP (media) session is now established with the SIP phone 102 of the first user. At 12, The SIP phone 102 of the first user terminates the session, and at 13, HIGA 108 relays the termination message towards the IMS Core 110.

Figure 2:
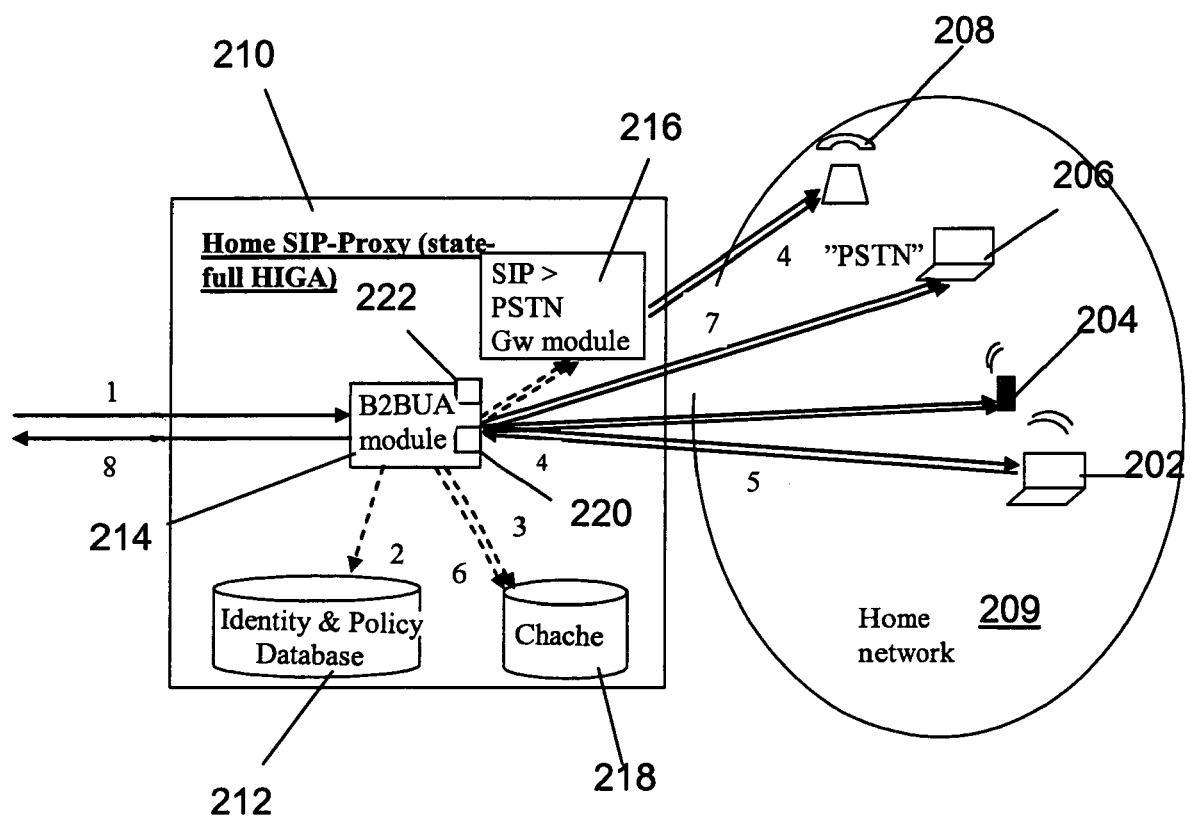
FIG. 2 is a schematic block diagram illustrating a first aspect of the communication system and the method according to the present invention.

FIG. 2 shows a first aspect of the communication system according to the present invention, which system connects to an IMS network and to three SIP communication terminals 202, 204, 206, in the form of mobile phones and computers, and one PSTN communication terminal 208, via a Home network 209. The users/communication terminals 202, 204, 206, 208 share a common IP Multimedia Public Identity, IMPU. The communication system includes a control device 210 for controlling sessions between the IMS network and the communication terminals 202, 204, 206, 208, which control device 210 is in the form of a state-full HIGA 210, and an Identity & Policy database 212 containing information about the identities of the users and/or the communication terminals sharing the common IMPU. The HIGA 210 includes a B2BUA 214 and a SIP-to-PSTN gateway 216. The B2BUA 214 is adapted to access the Identity & Policy database 212 when receiving a session invitation to the common IMPU via the IMS network and alert the communication terminals 202, 204, 206, 208 associated with the common IMPU. Memory means 218 for storing data about which users/communication terminals 202, 204, 206, 208 are alerted based on said session invitation is provided, in the form a Cache 218, and the HIGA 210 comprises retrieval means 220 for retrieving the data stored in Cache 218 when one of the communication terminals 202, 204, 206, 208 accepts the session invitation. The HIGA 210 comprises notification means 222 for sending a notification, containing information about the identity of the user/communication terminal accepting the session invitation, to the other alerted communication terminals 202, 204, 206, 208 associated with the common IMPU.

FIG. 2 also illustrates a first aspect of the method according to the present invention, for notifying the remaining communication terminals about the identity of the originator and the identity of the accepting user/terminal. The method includes the following steps: At 1, an IMS session invitation is directed towards the common IMPU of the communication terminals 202, 204, 206, 208. At 2, B2BUA 214 checks against the Identity & Policy database 212 which terminals/users shall receive this terminating session invitation. At 3, B2BUA 214 stores data about the alerted communication terminals 202, 204, 206, and data about the originator of the session invitation, in the Cache 218. At 4, B2BUA 214 forwards the session invitation in accordance with the information found in the Identity & Policy database 212. To the PSTN communication terminal 208, the session invitation is sent via the SIP-to-PSTN gateway 216. At 5, the communication terminal/user 202 accepts the session invitation. At 6, B2BUA 214 retrieves stored data, i.e. the identities of the terminals/users that shall receive a notification with information about which communication terminal/user has accepted the session and who the originator is, from the Cache 218. At 7, B2BUA 214 sends an information notification to concerned users/communication terminals 204, 206, 208. If the PSTN phone 208 has a graphical user interface (GUI) it will receive this information, given that the SIP-to-PSTN gateway is equipped with needed functionality. At 8, the HIGA 210 responses with an accepting confirmation to the IMS.

Figure 3:
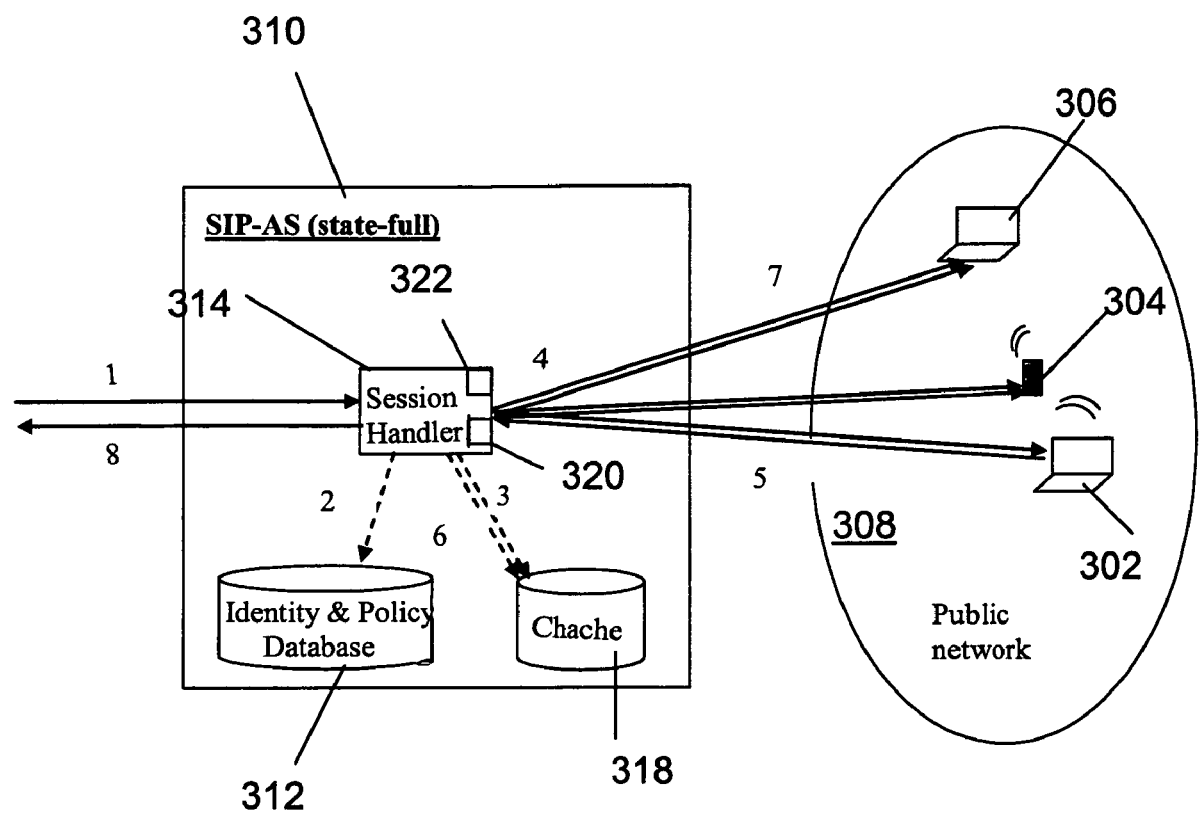
FIG. 3 is a schematic block diagram illustrating a second aspect of the communication system and the method according to the present invention.

FIG. 3 shows a second aspect of the communication system according to the present invention, which system connects to an IMS network and to three SIP mobile communication terminals 302, 304, 306, via a Public network 308. The users/communication terminals 302, 304, 306 share a common IP Multimedia Public Identity, IMPU. The communication system includes a control device in the form of a SIP-AS (statefull) 310, and an Identity & Policy database 312 as disclosed in connection with FIG. 2. The SIP-AS 310 includes a session handler 314. The SIP-AS 310 is adapted to access the Identity & Policy database 312 when receiving a session invitation to the common IMPU via the IMS network and alert the communication terminals 302, 304, 306 associated with the common IMPU. A cache 318 is provided for temporary storing data about which users/communication terminals are alerted based on said session invitation, and the SIP-AS 310 comprises retrieval means 320 for retrieving the data stored in the Cache 318 when one of the communication terminals 302, 304, 306 accepts the session invitation. The SIP-AS 310 comprises notification means 322 for sending a notification containing information about the identity of the user/terminal accepting the session invitation to the other alerted communication terminals 302, 304, 306 associated with the common IMPU.

FIG. 3 also illustrates a second aspect of the method according to the present invention, including the following steps: At 1, an IMS session invitation is directed towards the common IMPU of the communication terminals 302, 304, 306. At 2, the session handler 314 checks against the Identity & Policy database 312 which terminals/users shall receive this terminating session invitation. At 3, the session handler 314 stores data about the alerted communication terminals 302, 304, 306, and data about the originator of the session invitation, in the Cache 318. At 4, the session handler 314 forwards the session invitation in accordance with the information found in the Identity & Policy database 312. At 5, the communication user/terminal 302 accepts the session invitation. At 6, the session handler 314 retrieves stored data, i.e. the identities of the terminals/users that shall receive a notification with information about which communication terminal/user has accepted the session and who the originator was, from the Cache 318. At 7, the session handler 314 sends an information notification to concerned users/communication terminals 304, 306. At 8, the SIP-AS 310 responses with an accepting confirmation to the IMS.

Figure 4:
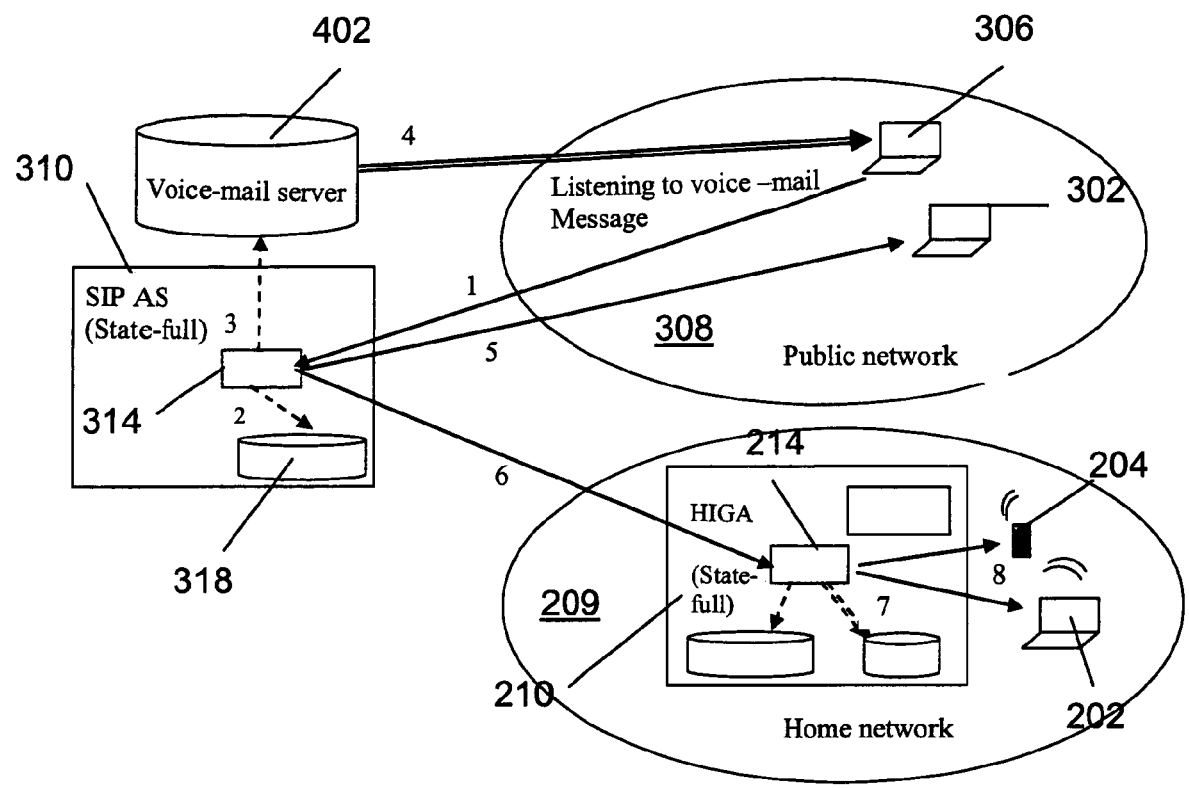
FIG. 4 is a schematic block diagram illustrating a third aspect of the communication system and the method according to the present invention.

FIG. 4 shows a third aspect of the communication system according to the present invention, where the embodiments of FIG. 2 and FIG. 3 has been combined into a combined system. The same reference signs are used for corresponding features. Further, this combined system comprises, and is adapted to access, a voice mail server 402 for recording and storing a message when none of the users/communication terminals 202, 204, 302, 306 accepts the session invitation. The notification means 322 of the SIP-AS 310 is adapted to notify all the users/communication terminals 202, 204, 302, 306 associated with the common IMPU that a message has been recorded, and retrieval means of the SIP-AS 310 is adapted to retrieve the data stored in the Cache 318 when one of the users/communication terminals 202, 204, 302, 306 consumes the recorded message. Further, the notification means 322 of the SIP-AS 310 is adapted to send a notification containing information about the identity of the terminal/user consuming the recorded message to the other users/communication terminals 202, 204, 302, 306 associated with the common IMPU.

FIG. 4 also illustrates a third aspect of the method according to the present invention, where the SIP-AS 310 is aware of to which user/terminal the originating session, which ended up as a voice-mail, was addressed, i.e., which communication terminals/users initially got the session alert. This data is stored in the Cache 318, with attached voice-mail identity, after the voice-mail notifications have been sent out. The method includes the following steps: At 1, the terminal 306 requests to listen the stored message. At 2, the session handler 314 of the SIP-AS 310 retrieves the identities/sip-URI:s for which the message was addressed. At 3, the SIP-AS 310 initiates the voice-mail server 402 to set up the media plan towards the communication terminal 306. At 4, the voice-mail is played out at communication terminal 306. At 5, the session handler 314 notifies the communication terminal 302 that the voice-mail has been consumed by the communication terminal 306. At 6, the session handler 314 notifies the HIGA 210 that the voice-mail has been consumed by the communication terminal 306. At 7, B2BUA 214 of HIGA 210 checks which users/terminals that shall be notified, i.e. which terminals have not been registered in the IMS network. At 8, B2BUA 214 of HIGA 210 notifies the communication terminals 202, 204 that the voice-mail has been consumed by the communication terminal 306.

The invention is not limited to the aspects and embodiments described in the foregoing. It will be obvious that many different modifications are possible within the scope of the following claims.

The invention claimed is:

1. A communication system connectable to an IP Multimedia Subsystem network, IMS network, and at least two communication terminals each associated with a user, the users of the communication terminals sharing a common IP Multimedia Public Identity, IMPU, the communication system comprising:
   a control device for controlling sessions between the IMS network and the communication terminals, and an identity database containing information about the identities of the users and/or the communication terminals sharing the common IMPU, the control device being adapted to access the identity database when receiving a session invitation to the common IMPU via the IMS network and alert the users/communication terminals associated with the common IMPU, and
   storage memory for storing data,
   wherein the communication system is arranged to provide said data when one of the users/communication terminals accepts the session invitation, about which users/communication terminals are alerted based on said session invitation,
   wherein the control device is arranged to retrieve the data stored in the storage memory when one of the users/communication terminals accept the session invitation,
   wherein the control device is further arranged to send a notification containing information about the identity of the user/communication terminal accepting the session invitation to the other alerted users/communication terminals associated with the common IMPU,
   wherein the communication system is adapted to access a voice mail server for recording and storing a message when none of the users/communication terminals accepts the session invitation,
   wherein the control device is adapted to notify all the users/communication terminals associated with the common IMPU that a message has been recorded,
   wherein the control device is adapted to retrieve the data stored in the storage memory when one of the users/communication terminals consumes the recorded message, and
   wherein the control device is adapted to send a notification containing information about the identity of the user/terminal consuming the recorded message to the other users/communication terminals associated with the common IMPU.

2. The communication system according to claim 1, wherein the control device is adapted to include information about the identity of the originator of the session invitation in said notification.

3. The communication system according to claim 1, wherein
   each communication terminal includes a storage memory.

4. The communication system according to claim 1,
   wherein the control device is provided with the storage memory, and
   wherein the control device is adapted to store data about the identity of the originator in the storage memory.

5. The communication system according to claim 1, wherein the control device and the communication terminals are adapted to communicate by means of the Session Initiation Protocol, SIP.

6. The communication system according to claim 1, wherein the control device is adapted to communicate with communication terminals via a Home network.

7. The communication system according to claim 1, wherein the control device is adapted to communicate with communication terminals via a Public network.

8. A method for controlling sessions between an IP Multimedia Subsystem network, IMS network, and at least two communication terminals each associated with a user, the users of the communication terminals sharing a common IP Multimedia Public Identity, IMPU, and information about the identities of the users and/or the communication terminals sharing the common IMPU being stored in an identity database, the method comprising:
   accessing the identity database when receiving a session invitation to the common IMPU via the IMS network, and checking which users/communication terminals shall receive the session invitation;
   alerting the users/communication terminals associated with the common IMPU;
   when one of the users/communication terminals accepts the session invitation, providing data about which users/communication terminals are alerted based on said session invitation; and
   sending a notification containing information about the identity of the terminal/user accepting the session invitation to the other alerted users/communication terminals associated with the common IMPU;
   recording and storing a message in a voice mail server when none of the users/communication terminals accepts the session invitation;
   notifying all the users/communication terminals associated with the common IMPU that a message has been recorded in the voice mail server;
   retrieving said data stored in the storage memory when one of the users/communication terminals consumes the recorded message; and
   based on said data, sending a notification containing information about the identity of the user/terminal consuming the recorded message to the other users/communication terminals associated with the common IMPU, wherein said step of providing includes,
storing said data in a storage memory; and
retrieving the data stored in the storage memory when one of the users/communication terminals accept the session invitation.

9. The method according to claim 8, further comprising:
including information about the identity of the originator of the session invitation in the notification to the other users/communication terminals associated with the common IMPU.

10. The method according to claim 8, further comprising:
storing data about the identity of the originator in the storage memory.

11. The method according to claim 8,
each communication terminal being provided with a storage memory, further comprising:
allowing each communication terminal to carry the information needed to inform the other users/communication terminals associated with the common IMPU.

12. The method according to claim 8, further comprising:
controlling the sessions between the IMS network, and the communication terminals by means of the Session Initiation Protocol, SIP.

* * * * *